Dec. 31, 1940.   H. D. HUMPHREY   2,226,662
BRAKE MECHANISM
Filed Aug. 5, 1939
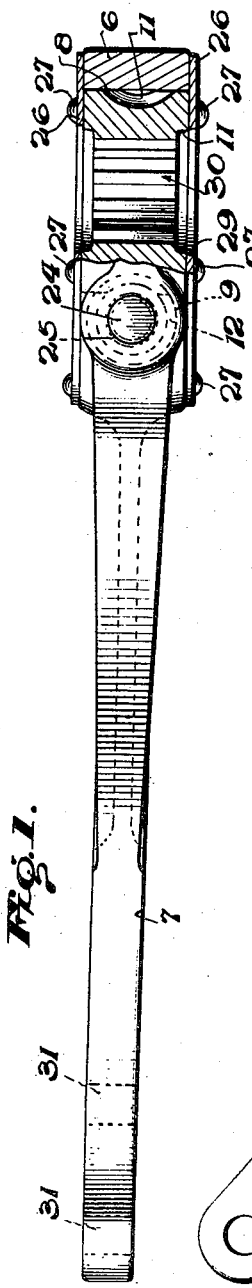
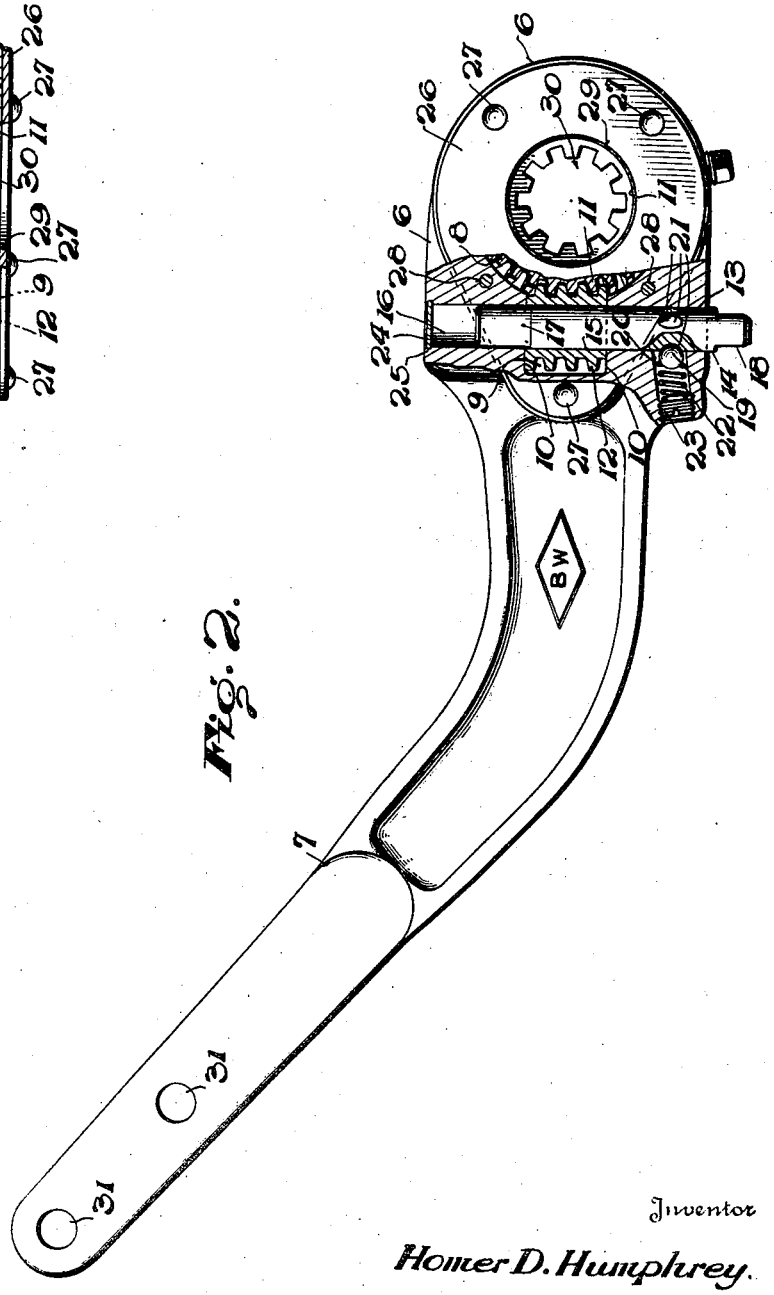
Inventor
Homer D. Humphrey.
By N. D. Parker Jr.
Attorney de-
UNITED STATES PATENT OFFICE 2,226,662

BRAKE MECHANISM

Homer D. Humphrey, Pittsburgh, Pa., assignor to Bendix-Westinghouse Automotive Air Brake Company, Pittsburgh, Pa., a corporation of Delaware Application August 5, 1939, Serial No. 288,659

4 Claims. (Cl. 74—522)

This invention relates to brake operating mechanism for vehicles, and more particularly to a slack adjusting device of the worm gear type.

One of the objects of the invention is to provide a slack adjusting device of simple and inexpensive construction which may be readily incorporated in the linkage of a vehicle brake system to take up the slack therein caused by brake wear.

Another object is to provide, in a device of the above type, a novel and efficient structure serving to locate and maintain the worm gears in proper meshing relationship at all times.

A further object is to provide, in a slack adjuster of the above character, a novel body or casing member for supporting the worm gears.

These and other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing, wherein similar reference characters refer to similar parts in the different views:

Fig. 1 is an end view of the device, partially in section, and

Fig. 2 is a side elevation, partially in section.

Referring now to the drawing and more particularly to Fig. 2, the present invention is illustrated as comprising a body member 6 having an operating lever 7 which may be formed integrally therewith, one portion of the member having a relatively large bore 8 therethrough together with a channel 9 formed in the wall of the bore coextensive axially therewith and having parallel walls 10 intersecting the wall of the bore. A relatively large worm gear or wheel 11 is positioned in the bore 8 for rotation therein and is adapted to engage a relatively small worm 12 positioned in channel 9 with its axis at right angles to and spaced from the axis of worm wheel 11 and held against axial movement by virtue of its location between the parallel walls 10 of channel 9.

In order that the worm 12 may be held against radial movement and maintained in proper meshing engagement with the worm wheel 11 at all times, a second bore 13 positioned at right angles to the bore 8 is formed in the body so as to intersect side walls 10 of channel 9 and provide bearings for a rotating worm shaft 14 mounted therein and having a portion in engagement with a bore 15 formed in the worm 12. Although driving engagement between the worm 12 and shaft 14 may be effected in a number of ways, this is accomplished in the illustrated embodiment of the invention by so dimensioning the diameters of the shaft 14 and the bore 15 of the worm that, on insertion of the shaft 14 in bore 13, the shaft must be forced through the bore of the worm, thus providing not only a so-called press fit between the parts and establishing a substantially positive driving connection therebetween, but at the same time rendering the worm effective for maintaining the shaft 14 longitudinally in the position shown, by virtue of the frictional connection between the parts and the abutment of worm 12 with channel walls 10, and without the need for additional and relatively expensive worm shaft retaining parts such as have been necessary in connection with slack adjusting devices previously proposed.

For convenience in assembling the above described parts, the bore 13 as shown is formed with a portion 16 of slightly reduced diameter, and a portion 17 of shaft 14 has a correspondingly reduced diameter, making it unnecessary to press this portion through the worm when the parts are being assembled. The worm shaft is provided at its lower end with flat portions 18 for receiving a wrench for adjusting the position of the shaft and worm, and is normally held against rotation by means of a spring pressed detent comprising a ball 19 carried in a bore 20 in the body and pressed into one of the depressions 21 in shaft 14 by a spring 22 interposed between the ball and an abutment member 23 adapted to be threadedly received by the bore. The entrance of dirt and water into the upper end of bore 13 may be readily prevented as by means of a plug 24 of the so-called Welsh type inserted in a counterbore 25 formed in the body.

With the slack adjuster parts assembled as heretofore described, the assembly is completed by the addition of plates 26 which may be attached to body 6 as by means of rivets 27 inserted through holes 28 in the body, these plates serving to close the ends of bore 8 and channel 9 as well as to prevent axial movement of the worm wheel 11. Apertures 29 are provided in plates 26 to permit driving engagement of a brake operating shaft, not shown, with a suitable splined bore 30 provided in worm wheel 11, and lever arm 7 is provided with clevis pin holes 31 in order to provide means for connecting the brake operating mechanism, not shown, to the lever.

It will be readily apparent from the foregoing description that there has been provided by the present invention an efficient slack adjusting device whereby the slack due to brake wear may be compensated for by rotating the worm 12 by means of worm shaft 14 for imparting corresponding rotation to worm wheel 11 and varying the angular relation between lever arm 7 and the worm wheel. This desirable end has been accomplished with a minimum number of parts, by providing a body member formed to limit radial and axial movement of the worm wheel and worm respectively, the addition of a worm shaft in frictional engagement with the bore of the worm and a pair of cover plates carried by the housing serving, in cooperation with the novel body structure, to maintain the worm gears and worm shaft in their normal operating relationship and to protect the bears from the harmful action of dirt and other foreign substances.

While an embodiment of the invention has been illustrated and described with considerable particularity, it is to be understood that the invention is not restricted thereto but is capable of receiving a variety of expressions, some of which will now readily suggest themselves to those skilled in the art, while changes may be made in the details of construction and arrangement of parts, and certain features used without other features, without departing from the spirit of the invention. Reference is, therefore, to be had to the claims hereto appended for a definition of the limits of the invention.

What is claimed is:

1. A slack adjuster for brakes comprising a body having a brake lever, a worm wheel and worm, a bore extending through said body for rotatably supporting said worm wheel, a channel formed in the wall of said bore and coextensive therewith for receiving the worm and preventing axial movement thereof, a pair of cover plates carried by the body for closing the ends of the channel and preventing axial movement of said worm wheel in said bore, and means for positioning and operating said worm in driving engagement with said worm wheel including a second bore in said body and a shaft rotatably mounted therein having a portion in frictional engagement with said worm.

2. A slack adjuster for brakes comprising a body having a brake lever, a bore extending through said body and a worm wheel rotatably mounted therein, a second bore in said body at right angles to said first named bore and spaced axially therefrom, a channel formed in the wall of said first named bore coextensive therewith and having parallel side walls intersecting the wall of said second named bore in planes perpendicular thereto, a worm having a bore therethrough mounted in said channel and having parallel end faces in abutting relationship with said side walls, closure members carried by the body for closing the ends of said channel and preventing axial movement of said worm wheel, and a shaft rotatably mounted in said second named bore and extending through the bore of said worm for positioning and maintaining said worm in meshing relationship with said worm wheel and having a portion in frictional engagement with the bore of said worm for preventing relative axial movements of said worm and shaft.

3. A slack adjuster for brakes comprising a body having a brake lever, a bore through said body, a channel formed in the wall of said bore coextensive therewith and having parallel side wall portions, a second bore in said body perpendicular to and intersecting the parallel side wall portions of said channel, a worm wheel rotatably mounted in said first named bore, means including a pair of plates carried by the body for closing the ends of said channel and preventing axial movement of the worm wheel, a shaft rotatably mounted in said second named bore, and a hollow worm mounted on said shaft in said channel and maintained in meshing engagement with the worm wheel by said shaft, the bore of the worm being in frictional engagement with a portion of the shaft for preventing relative rotational and axial movement therebetween and the ends of the worm abutting the parallel side wall portions of the channel for preventing axial movement of the worm.

4. A slack adjuster for brakes comprising a body having a brake lever, a worm wheel, a worm, a bore in said body for rotatably supporting said worm wheel, a channel formed in the wall of said bore coextensive therewith and having substantially parallel walls for receiving said worm and preventing axial movement thereof, closure means carried by the body for preventing axial movement of said worm wheel in said bore, a second bore in said body, a shaft rotatably mounted in said bore, and means connecting said shaft and worm for preventing relative rotational and axial movement therebetween.

HOMER D. HUMPHREY.